United States Patent
Park

(10) Patent No.: US 7,662,886 B2
(45) Date of Patent: Feb. 16, 2010

(54) DYNAMIC VULCANIZATION OF FLUOROCARBON ELASTOMERS CONTAINING PEROXIDE CURE SITES

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 12/241,537

(22) Filed: Sep. 30, 2008

(65) Prior Publication Data

US 2009/0022922 A1    Jan. 22, 2009

Related U.S. Application Data

(63) Continuation of application No. 11/170,611, filed on Jun. 29, 2005, now abandoned.

(51) Int. Cl.
    C08L 27/12    (2006.01)
(52) U.S. Cl. .................. 525/199; 524/544; 524/545; 524/546; 525/200; 525/276
(58) Field of Classification Search .............. 525/199, 525/200, 276; 524/544, 545, 546
See application file for complete search history.

(56) References Cited

U.S. PATENT DOCUMENTS

| | | | |
|---|---|---|---|
| 2,476,884 A | 7/1949 | Maynard |
| 2,710,290 A | 6/1955 | Safford et al. |
| 2,927,908 A | 3/1960 | Konkle et al. |
| 3,037,954 A | 6/1962 | Gessler et al. |
| 3,538,028 A | 11/1970 | Morgan |
| 3,580,889 A | 5/1971 | Barney |
| 3,787,341 A | 1/1974 | Aron |
| 3,853,811 A | 12/1974 | Chandrasekaran |
| 3,884,877 A | 5/1975 | Kolb |
| 4,035,565 A | 7/1977 | Apotheker et al. |
| 4,094,949 A | 6/1978 | Yokokawa et al. |
| 4,202,555 A | 5/1980 | Becker et al. |
| 4,287,320 A | 9/1981 | Kolb |
| 4,311,628 A | 1/1982 | Abdou-Sabet et al. |
| 4,328,140 A | 5/1982 | Singletary et al. |
| 4,386,170 A | 5/1983 | Monroe |
| 4,419,499 A | 12/1983 | Coran et al. |
| 4,450,263 A | 5/1984 | West |
| 4,451,542 A | 5/1984 | Ishida et al. |
| 4,491,536 A | 1/1985 | Tomoda |
| 4,530,881 A | 7/1985 | Santoso et al. |
| 4,553,761 A | 11/1985 | Blesing et al. |
| 4,572,516 A | 2/1986 | Symons et al. |
| 4,596,855 A | 6/1986 | Stewart |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,696,998 A | 9/1987 | Brunelle |
| 4,713,418 A | 12/1987 | Logothetis et al. |
| 4,787,991 A | 11/1988 | Morozumi et al. |
| 4,812,357 A | 3/1989 | O'Rell et al. |
| 5,006,594 A | 4/1991 | Rees |
| 5,018,749 A | 5/1991 | Forch |
| 5,095,072 A | 3/1992 | Kobayashi et al. |
| 5,108,780 A | 4/1992 | Pitt et al. |
| 5,206,293 A | 4/1993 | Sakai et al. |
| 5,217,137 A | 6/1993 | Andrews |
| 5,219,931 A | 6/1993 | Siol et al. |
| 5,331,040 A | 7/1994 | Lee |
| 5,354,811 A | 10/1994 | Kamiya et al. |
| 5,370,404 A | 12/1994 | Klein et al. |
| 5,371,143 A | 12/1994 | Novak et al. |
| 5,384,374 A | 1/1995 | Guerra et al. |
| 5,391,610 A | 2/1995 | Comert et al. |
| 5,397,832 A | 3/1995 | Ellul |
| 5,427,387 A | 6/1995 | Johnston |
| 5,459,202 A | 10/1995 | Martinez et al. |
| 5,548,028 A | 8/1996 | Tabb |
| 5,585,152 A | 12/1996 | Tamura et al. |
| 5,589,526 A | 12/1996 | Sienel et al. |
| 5,639,810 A | 6/1997 | Smith, III |
| 5,700,866 A | 12/1997 | Tabb |
| 5,713,577 A | 2/1998 | Lannert et al. |
| 5,723,544 A | 3/1998 | Lee |
| 5,747,588 A | 5/1998 | Mann |

(Continued)

FOREIGN PATENT DOCUMENTS

CA    2475263    9/2003

(Continued)

OTHER PUBLICATIONS

"Fluorine-Containing Polymers" Encyclopedia of Polymer Science & Engineering, vol. 7, Second Edition (1987). (pp. 256-267).

(Continued)

*Primary Examiner*—Bernard Lipman
(74) *Attorney, Agent, or Firm*—Ronald W. Wangerow; Harness, Dickey & Pierce, P.L.C.

(57) ABSTRACT

Processable rubber compositions contain a vulcanized elastomeric material dispersed in a matrix of a thermoplastic polymeric material. The vulcanized elastomeric material is a peroxide cure polymeric material containing repeating units derived from fluorine-containing monomers and at least one peroxide cure site monomer. In one embodiment the matrix forms a continuous phase and the vulcanized elastomeric material is in the form of particles forming a non-continuous phase. The compositions are made by combining a radical curing system, a fluorocarbon elastomer material, and a fluoroplastic material, and heating the mixture at a temperature and for a time sufficient to effect vulcanization of the elastomeric material, while mechanical energy is applied to mix the mixture during the heating step. Shaped articles may be readily formed from the rubber compositions according to conventional thermoplastic processes such as blow molding, injection molding, and extrusion. Examples of useful articles include seals, gaskets, O-rings, and hoses.

26 Claims, No Drawings

U.S. PATENT DOCUMENTS

| | | | |
|---|---|---|---|
| 5,758,881 A | 6/1998 | Stanley |
| 5,792,348 A | 8/1998 | Eisinga |
| 5,910,544 A | 6/1999 | Ozawa et al. |
| 5,962,589 A | 10/1999 | Matsumoto et al. |
| 6,048,939 A | 4/2000 | Priester |
| 6,054,537 A | 4/2000 | Shimizu et al. |
| 6,066,697 A | 5/2000 | Coran et al. |
| 6,079,465 A | 6/2000 | Takeyama et al. |
| 6,114,441 A | 9/2000 | Spohn et al. |
| 6,147,158 A | 11/2000 | Chmielewski |
| 6,162,385 A | 12/2000 | Grosse-Puppendahl et al. |
| 6,303,870 B1 | 10/2001 | Nazaryan et al. |
| 6,310,141 B1 | 10/2001 | Chen et al. |
| 6,312,639 B1 | 11/2001 | Ertle et al. |
| 6,407,174 B1 | 6/2002 | Ouhadi |
| 6,409,177 B1 | 6/2002 | Johnston |
| 6,410,630 B1 | 6/2002 | Hoover et al. |
| 6,429,249 B1 | 8/2002 | Chen et al. |
| 6,437,030 B1 | 8/2002 | Coran et al. |
| 6,500,374 B1 | 12/2002 | Akioka et al. |
| 6,520,507 B2 | 2/2003 | Pataille et al. |
| 6,624,251 B1 | 9/2003 | Chmielewski |
| 6,649,217 B1 | 11/2003 | Gust |
| 6,649,704 B2 | 11/2003 | Brewer et al. |
| 6,656,831 B1 | 12/2003 | Lee et al. |
| 6,663,966 B2 | 12/2003 | Mhetar |
| 6,729,624 B1 | 5/2004 | Johnston |
| 6,737,479 B2 | 5/2004 | Faulkner |
| 6,774,171 B2 | 8/2004 | Kassa et al. |
| 6,787,221 B2 | 9/2004 | Botrie et al. |
| 6,806,306 B2 | 10/2004 | Chmielewski et al. |
| 6,860,486 B2 | 3/2005 | Hacker et al. |
| 6,872,325 B2 | 3/2005 | Bandyopadhyay et al. |
| 6,939,477 B2 | 9/2005 | Stark et al. |
| 6,945,537 B2 | 9/2005 | Guillerme et al. |
| 7,022,769 B2 | 4/2006 | Park |
| 7,029,750 B2 | 4/2006 | Takei |
| 7,087,679 B2 | 8/2006 | Shimizu et al. |
| 7,098,270 B2 | 8/2006 | Hochgesang et al. |
| 7,135,527 B2 | 11/2006 | Park |
| 7,151,134 B2 | 12/2006 | Park et al. |
| 7,153,908 B2 | 12/2006 | Park |
| 7,351,769 B2 | 4/2008 | Park |
| 7,413,697 B2 | 8/2008 | Park et al. |
| 2002/0158421 A1 | 10/2002 | Johnston |
| 2002/0198320 A1 | 12/2002 | Chmielewski |
| 2003/0026995 A1 | 2/2003 | Duchesne et al. |
| 2003/0138655 A1 | 7/2003 | Watanabe et al. |
| 2003/0166780 A1 | 9/2003 | Shimizu et al. |
| 2004/0183702 A1 | 9/2004 | Nachtigal et al. |
| 2004/0260023 A1 | 12/2004 | Park et al. |
| 2005/0148183 A1 | 7/2005 | Shiro et al. |
| 2005/0155690 A1 | 7/2005 | Park |
| 2005/0165168 A1 | 7/2005 | Park |
| 2005/0167928 A1 | 8/2005 | Park et al. |
| 2005/0171282 A1 | 8/2005 | Park |
| 2005/0222337 A1 | 10/2005 | Park |
| 2005/0272872 A1 | 12/2005 | Park |
| 2005/0275565 A1 | 12/2005 | Nachtigal et al. |
| 2005/0281973 A1 | 12/2005 | Park |
| 2005/0288434 A1 | 12/2005 | Sugiura et al. |
| 2006/0003127 A1 | 1/2006 | Park et al. |
| 2006/0004126 A1 | 1/2006 | Park et al. |
| 2006/0004142 A1 | 1/2006 | Park et al. |
| 2006/0124889 A1 | 6/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2006/0290070 A1 | 12/2006 | Park |
| 2007/0004862 A1 | 1/2007 | Park |
| 2007/0004865 A1 | 1/2007 | Park |
| 2007/0044906 A1 | 3/2007 | Park |
| 2007/0055020 A1 | 3/2007 | Park |
| 2007/0060707 A1 | 3/2007 | Park |
| 2007/0142555 A1 | 6/2007 | Park |
| 2007/0167574 A1 | 7/2007 | Park |
| 2007/0210530 A1 | 9/2007 | Park |
| 2008/0149881 A1 | 6/2008 | Park |
| 2008/0157439 A1 | 7/2008 | Park |

FOREIGN PATENT DOCUMENTS

| | | |
|---|---|---|
| CA | 2513789 | 8/2004 |
| EP | 0132583 | 2/1985 |
| EP | 0148719 | 7/1985 |
| EP | 0239707 | 10/1987 |
| EP | 0168020 | 10/1989 |
| EP | 0356619 | 3/1990 |
| EP | 0422960 | 4/1991 |
| EP | 0431325 | 6/1991 |
| EP | 0432911 | 6/1991 |
| EP | 0254307 | 12/1991 |
| EP | 0304843 | 3/1993 |
| EP | 0566313 | 10/1993 |
| EP | 0439734 | 12/1994 |
| EP | 0681113 | 11/1995 |
| EP | 0714944 | 6/1996 |
| EP | 1046841 | 10/2000 |
| EP | 1209203 | 5/2002 |
| EP | 1555110 | 7/2005 |
| EP | 1591469 | 11/2005 |
| GB | 1357904 | 6/1974 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO 9600761 | 1/1996 |
| WO | WO 00/11073 | 3/2000 |
| WO | WO 01/48077 | 7/2001 |
| WO | WO 01/98405 | 12/2001 |
| WO | WO 02/070929 | 9/2002 |

OTHER PUBLICATIONS

"Polyurethanes" Encyclopedia of Polymer Science & Engineering, vol. 13, Second Edition (Date Unknown). (pp. 274-278).

Webpage: "Dyneon™ Fluorothermoplastics" Accessed from 3M Manufacturing and Industrial and Downloaded May 8, 2003. (2 pages).

"Viton® Fluoroelastomer, A Product of DuPont Dow Elastomers", Technical Information, DuPont Dow Elastomers, Copyright 1988.

"AFLAS™ The Fluoroelastomer," Asahi Glass Company, Product Information, Apr. 11, 2003. (8 pages).

Webpage: Tetrafluoroethylene-Propylene Rubber, Date Unknown. (3 pages).

Schmiegel, Walter W., "A Review of Recent Progress in the Design and Reactions of Base-Resistant Fluoroelastomers", DuPont Dow Elastomers, IRC, Jul. 2003.

Moore, Michael J. "Silanes as Rubber-to-Metal Bonding Agents," 160th Meeting of the Rubber Division, American Chemical Society, Cleveland, Ohio, Paper No. 105, (2001). (17 pages).

Viton® Fluoroelastomer: Viton Extreme ETP-600S Technical Information (Formerly designated VTR-8710), DuPont Dow Elastomers (Date Unknown). (6 pages).

Material Safety Data Sheet "DuPont™ TPV 60A01 and 80A01", C.S. Wong, (Sep. 18, 2001). (9 pages).

DuPont "Grades for Customer Evaluation"—TPV 60A and TPV 80A. (3 pages).

OTHER PUBLICATIONS

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Sasol: Sasol Olefins and Surfactants available at www.sasoltechdata.com. (20 pages).

US 7,662,886 B2

DYNAMIC VULCANIZATION OF FLUOROCARBON ELASTOMERS CONTAINING PEROXIDE CURE SITES

CROSS-REFERENCE TO RELATED APPLICATION

This application is a continuation application of U.S. patent application Ser. No. 11/170,611 filed Jun. 29, 2005, the disclosure of which is incorporated herein by reference.

FIELD OF THE INVENTION

The present invention relates to thermoprocessable compositions containing cured fluorocarbon elastomers. It also relates to seal and gasket type material made from the compositions and methods for their production by dynamic vulcanization techniques.

BACKGROUND OF THE INVENTION

Cured elastomeric materials have a desirable set of physical properties typical of the elastomeric state. They show a high tendency to return to their original size and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

In today's automobile engines, the high temperatures of use have led to the development of a new generation of lubricants containing a high level of basic materials such as amines. Articles made from elastomeric materials, such as seals and gaskets, are in contact with such fluids during use, and are subject to a wide variety of challenging environmental conditions, including exposure to high temperature, contact with corrosive chemicals, and high wear conditions during normal use. Accordingly, it is desirable to make such articles from materials that combine elastomeric properties and stability or resistance to the environmental conditions.

To meet the demands of the new lubricant technology, a line of fluorocarbon elastomers has been developed highly resistant to the basic compounds found in the lubricating oils and greases. Specifically, cured elastomers based on copolymers of tetrafluoroethylene and propylene have met commercial success. As a thermoset material, the cured fluorocarbon rubber is subject to the processing disadvantages noted above.

It would be desirable to provide an elastomeric or rubber composition that would combine a high level of chemical resistance with the advantages of thermoplastic processability. It would further be desirable to provide methods for formulating chemically resistant rubbers having such advantageous properties.

SUMMARY OF THE INVENTION

These and other advantages are achieved with a processable rubber composition containing a vulcanized elastomeric material dispersed in a matrix of a thermoplastic polymeric material. The vulcanized elastomeric material comprises a peroxide cured polymeric material comprising repeating units derived in one embodiment from tetrafluoroethylene, at least one $C_{2-4}$ olefin, optionally one or more additional fluorine-containing monomers, and low levels of a peroxide cure site monomer that contains at least one of a C—Cl bond, a C—Br bond, a C—I bond, and an olefin. In one embodiment the matrix forms a continuous phase and the vulcanized elastomeric material is in the form of particles forming a non-continuous phase. In various embodiments, the processable compositions are thermally processed into molded articles that exhibit a high degree of base resistance, especially a high degree of resistance to degradation of physical properties upon exposure to fluids containing strong nucleophiles such as amines.

A method for making a rubber composition comprises combining a radical curing system, a curable elastomeric material having cure sites highly reactive to radical initiators, and a thermoplastic material, and heating the mixture at a temperature and for a time sufficient to effect vulcanization of the elastomeric material, while mechanical energy is applied to mix the mixture during the heating step. The elastomeric material is a fluorocarbon polymer and the thermoplastic material comprises a fluorine containing polymeric material that softens and flows upon heating.

Shaped articles may be readily formed from the rubber compositions according to conventional thermoplastic processes such as blow molding, injection molding, and extrusion. Examples of useful articles include seals, gaskets, O-rings, and hoses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention. All percentages herein are by weight, unless stated otherwise.

When exposed to environments containing strong nucleophiles such as the amines in modern day engine oils in automotive applications, rubbers tend to change their elastomeric properties with time of exposure. Normally the rubbers degrade over time when exposed to such fluids. The degradation is expressed as a change in physical parameters such as tensile strength, modulus, hardness, elongation at break, and others. According to various embodiments of the invention, it has been found that base resistance is enhanced when fluorocarbon rubbers are cured by radical curing systems in the presence of thermoplastic materials as discussed herein. The processable compositions are made into various molded articles such as seals, gaskets, o-rings, hoses, and the like. The molded articles exhibit an advantageous combination of elastomeric properties. Furthermore, in various embodiments, the base resistance of articles made from the processable compositions of the invention is higher than that of articles made of the cured fluorocarbon rubbers themselves.

In one embodiment, the invention provides processable rubber compositions that contain a vulcanized elastomeric material dispersed in a matrix. The vulcanized elastomeric material is a peroxide cured fluorocarbon elastomer comprising repeating units derived from at least one fluorine containing olefinic monomer and at least one cure site monomer, with the cure site monomer comprising at least one of a C—Cl bond, a C—Br bond, a C—I bond, and an olefin. The matrix comprises a thermoplastic polymeric material, preferably a fluorine containing material, also called a fluoroplastic. In a preferred embodiment, the vulcanized elastomeric material is a polymeric material containing repeating units derived from tetrafluoroethylene and from at least one $C_{2-4}$ olefin, and containing crosslinks resulting from the reaction of peroxide curing agents and co-agents with radical cure site monomers in the polymeric material.

In one aspect, the matrix forms a continuous phase and the vulcanized elastomeric material is in the form of particles forming a non-continuous phase. In another aspect, the elastomeric material and the matrix form co-continuous phases.

In another embodiment, the invention provides methods for making the processable rubber compositions by dynamic vulcanization of the elastomeric component in the presence of the thermoplastic component. In one embodiment, the method comprises forming a mixture by combining a radical curing system, an elastomeric material, and a thermoplastic material, and heating the mixture at a temperature and for a time sufficient to effect vulcanization of the elastomeric material. Mechanical energy is applied to mix the mixture during the heating step. The elastomeric material comprises a polymeric material comprising repeating units derived from at least one fluorine containing olefinic monomer and from at least one cure site monomer; the repeating unit derived from the at least one cure site monomer comprises at least one functional group selected from the group consisting of a C—Br bond, a C—I bond, and an olefin. The thermoplastic material comprises a fluorine containing polymeric material that softens and flows upon heating.

In various embodiments, the method of the invention provides for mixing the elastomer and thermoplastic components in the presence of a curing system and heating during the mixing to effect cure of the elastomeric component. In one embodiment, the elastomeric material and thermoplastic material are mixed for a time and at a shear rate sufficient to form a dispersion of the elastomeric material in a continuous thermoplastic phase. Thereafter, a radical curing system such as a peroxide and crosslinking co-agent is added to the dispersion of elastomeric material and thermoplastic material while continuing the mixing. Finally, the dispersion is heated while continuing to mix to produce a processable rubber composition of the invention.

In various embodiments, the processable rubber compositions of the invention are readily processable by conventional plastic processing techniques. In one embodiment, shaped articles are provided comprising the vulcanized elastomeric materials dispersed in a thermoplastic matrix. Shaped articles of the invention include, without limitation, seals, O-rings, gaskets, and hoses.

Various types of fluoroelastomers may be used. One classification of fluoroelastomers is given in ASTM-D 1418, "Standard practice for rubber and rubber latices-nomenclature." The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68-69.5% by weight fluorine. Another FKM elastomer is chemically described as a terpolymer of tetrafluoroethylene, a fluorinated vinyl ether, and vinylidene fluoride. Such elastomers tend to have improved low temperature performance. In various embodiments, they are available with 62-68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, and a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr).

The fluorocarbon elastomers and cured fluorocarbon elastomers used in the compositions and methods of the invention contain repeating units derived from one or more fluorine containing olefinic monomers as described above, and further contain repeating units derived from so-called peroxide cure site monomers, which are described in further detail below. The repeating units are derived from the corresponding monomers in the sense that the structure of the polymer results from a copolymerization of the olefinic monomers and the resulting structure is recognized as the addition polymerization product of the monomers. In the cured elastomers, at least some of the repeating units derived from the cure site monomers contain so-called peroxide crosslinks. In one embodiment, the peroxide crosslinks are formed by the reaction of polyolefinic co-agents with radicals on the cure site monomers induced by the action of the peroxide component of the radical curing system.

Preferred copolymer fluorocarbon elastomers include VDF/HFP/CSM, VDF/HFP/TFE/CSM, VDF/PFVE/TFE/CSM, TFE/Pr/CSM, TFE/Pr/VDF/CSM, TFE/Et/PFVE/VDF/CSM, TFE/Et/PFVE/CSM and TFE/PFVE/CSM, where CSM represents the peroxide cure site monomers. The elastomer designation gives the monomers from which the elastomer gums are synthesized. In some embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, DuPont, and Daikin.

As used herein, elastomer refers, according to context, to either a non-cured or a cured fluorocarbon elastomer. The terms "cured elastomer", "peroxide cured fluorocarbon elastomer", and the like describe the product of curing or crosslinking the un-cured elastomer with a radical curing system.

In various preferred embodiments, the elastomeric material is described chemically as a copolymer of tetrafluoroethylene and at least one $C_{2-4}$ olefin and further containing cure site monomer. Optionally, the elastomeric material contains repeating units derived from one or more additional fluorine-containing monomers. As such, the cured elastomeric material comprises repeating units derived from tetrafluoroethylene and at least one $C_{2-4}$ olefin, and further comprises peroxide crosslinks.

In a preferred embodiment, the elastomeric material comprises repeating units derived from 10-90 mole % tetrafluoroethylene, 10-90 mole % $C_{2-4}$ olefin, and up to 30 mole % of one or more additional fluorine-containing monomers. Preferably, the repeating units are derived from 25-90 mole % tetrafluoroethylene and 10-75 mole % $C_{2-4}$ olefin. In another preferred embodiment, the repeating units are derived from 45-65 mole % tetrafluoroethylene and 20-55 mole % $C_{2-4}$ olefin.

In particularly preferred embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from DuPont under the Viton® ETP trade name.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

In various embodiments, the fluoroelastomers of the compositions of the invention contain repeating units derived from peroxide cure site monomers. In various embodiments, the fluorocarbon elastomers contain up to 5 mole % and preferably up to 3 mole % of repeating units derived from the so-called cure site monomers. In one embodiment, the cure site repeating units are derived from halogen-containing olefin monomers, wherein the halogen is chlorine, bromine, iodine, or combinations of any of them. If used, preferably the repeating units of a halogen-containing olefin are present in a level to provide at least about 0.05% halogen in the polymer, preferably 0.3% halogen or more. In a preferred embodiment, the total weight of halogen in the polymer is 1.5 wt. % or less.

The cure site monomers provide sites on the elastomeric material that react at a high rate with radical initiators such as peroxides. The cure site monomer sites react faster with the curing system than other parts of the elastomer. Crosslinking thus occurs preferentially at the cure site monomers. It is believed that this crosslinking action is responsible at least in part for development of elastomeric properties in the elastomer. The cure site monomers are preferably selected from the group consisting of brominated, chlorinated, and iodinated olefins; brominated, chlorinated, and iodinated unsaturated ethers; and non-conjugated dienes.

In preferred embodiments, the fluoroelastomers comprise at least one halogenated cure site or a reactive double bond resulting from the presence of a copolymerized unit of a non-conjugated diene. The double bond of the cure site monomer is referred to herein as an olefin. Functional groups associated with the cure sites thus include a carbon bromine (C—Br) bond, a carbon iodine (C—I) bond, a carbon chlorine (C—Cl) bond, and an olefin. In various embodiments, halogenated cure sites are provided by copolymerized cure site monomers and/or by halogen atoms that are present at terminal positions of the fluoroelastomer polymer chain. Generically, the halogenated cure sites are said to be repeating units derived from a cure site monomer. Co-polymerized cure site monomers, reactive double bonds, and halogenated end groups are capable of reacting to form crosslinks, especially under conditions of catalysis or initiation by the action of peroxides.

As is clear from this discussion, the repeating units of an uncured elastomer derived from the cure site monomers contain one or more of those functional groups. On the other hand, in cured elastomers, some of the functional groups will be reacted with the curing system. In both cases, it is said that the elastomer contains repeating units derived from peroxide cure site monomers.

Brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2$ Br—$R_f$—O—CF=$CF_2$ ($R_f$ is perfluoroalkylene), such as $CF_2$ $BrCF_2$ O—CF=$CF_2$, and fluorovinyl ethers of the class ROCF=CFBr or ROCBr=$CF_2$, where R is a lower alkyl group or fluoroalkyl group, such as $CH_3$OCF=CFBr or $CF_3$ $CH_2$ OCF=CFBr.

Iodinated olefins may also be used as cure site monomers. Suitable iodinated monomers include iodinated olefins of the formula: CHR=CH—Z—$CH_2$CHR—I, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: I($CH_2CF_2CF_2$)$_n$OCF=$CF_2$ and I$CH_2CF_2$O[CF($CF_3$)$CF_2$O]$_n$ CF=$CF_2$,and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,3 3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694, 045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, cure site monomers and repeating units derived from them containing iodine, bromine or mixtures thereof are present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1, 1-difluoroethane and others such as disclosed in U.S. Pat. No. 5,151,492.

A wide variety of thermoplastic polymeric materials can be used in the invention. In one embodiment, the thermoplastic polymeric material used is a thermoplastic elastomer. Preferred thermoplastic elastomers include those having a crystalline melting point of 120° C. or higher, preferably 150° C. or higher, and more preferably 200° C. or higher.

Thermoplastic elastomers have some physical properties of rubber, such as softness, flexibility and resilience, but can be processed like thermoplastics. A transition from a melt to a solid rubber-like composition occurs fairly rapidly upon cooling. This is in contrast to convention elastomers, which hardens slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by (A-B)$_n$, where A represents the hard segments and B the soft segments as described above.

Many thermoplastic elastomers are known. They in general adapt either the A-B-A triblock structure or the (A-B)$_n$ repeating structure. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. In one embodiment, the materials are crystalline or semi-crystalline polymers, preferably having a crystallinity of at least 25% as measured by differential scanning calorimetry. Amorphous polymers with a suitably high glass transition temperature are also acceptable as the thermoplastic polymeric material. In a preferred embodiment, the thermoplastic has a melt temperature or a glass transition temperature in the range from about 80° C. to about 350° C., but the melt temperature should generally be lower than the decomposition temperature of the thermoplastic vulcanizate. In various embodiments, the melting point of crystalline or semi-crystalline polymers is 120° C. or higher, preferably 150° C. or higher, and more preferably 200° C. or higher. Suitable thermoplastic materials include both fluoroplastics and non-fluoroplastics.

Non-limiting examples of thermoplastic polymers include polyolefins, polyesters, nylons, polycarbonates, styrene-acrylonitrile copolymers, polyethylene terephthalate, polybutylene terephthalate, polyamides including aromatic polyamides, polystyrene, polystyrene derivatives, polyphenylene oxide, polyoxymethylene, and fluorine-containing thermoplastics. Polyolefins are formed by polymerizing α-olefins such as, but not limited to, ethylene, propylene, 1-butene, 1-hexene, 1-octene, 2-methyl-1-propene, 3-methyl-1-pentene, 4-methyl-i-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-l-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary are the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In a preferred embodiment, the thermoplastic polymeric material comprises a fluorocarbon thermoplastic polymer, also referred to as a "fluoroplastic". Commercial embodiments are available that contain 59 to 76% by weight fluorine. They may either be fully fluorinated or partially fluorinated. In various other preferred embodiments, the thermoplastic is selected from thermoplastic elastomers, high molecular weight plastic materials, and other thermoplastic polymeric materials that do not contain fluorine. Mixtures of fluoroplastics and non-fluoroplastics may also be used.

Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Fully fluorinated fluoroplastics are characterized by relatively high melting points, when compared to the vinylidene fluoride based thermoplastics that are also included in the fluoroplastic blend of the invention. As examples, PFA has a melting point of about 305° C., MFA has a melting point of 280-290° C., and FEP has a melting point of about 260-290° C. The melting point of individual grades depends on the exact structure, processing conditions, and other factors, but the values given here are representative.

Partially fluorinated fluoroplastics such as the vinylidene fluoride homo- and copolymers described above have relatively lower melting points than the fully fluorinated fluoroplastics. For example, polyvinylidene fluoride has a melting point of about 160-170° C. Some copolymer thermoplastics have an even lower melting point, due to the presence of a small amount of co-monomer. For example, a vinylidene fluoride copolymer with a small amount of hexafluoropropylene, exemplified in a commercial embodiment such as the Kynar Flex series, exhibits a melting point in the range of about 105-160° C., and typically about 130° C. These low melting points lead to advantages in thermoplastic processing, as lower temperatures of melting lead to lower energy costs and avoidance of the problem of degradation of cured elastomers in the compositions.

The fluorocarbon elastomers described above are dynamically cured in the presence of the thermoplastic polymeric material and a radical curing system. The radical curing system contains a radical initiator and a crosslinking co-agent.

The radical initiator is believed to function by first extracting a hydrogen or halogen atom from the fluorocarbon elastomer to create a free radical that can be crosslinked. It is believed that the cure site monomers described above provide sites that react with the radical initiator at an accelerated rate, so that subsequent crosslinking described below occurs mainly at the cure site monomers. Crosslinking co-agents are normally included in the radical curing system. They contain at least two sites of olefinic unsaturation, which react with the free radical on the fluorocarbon elastomer molecule generated by the reaction of the initiator.

In various embodiments, the initiators have peroxide functionality. As examples of initiators, a wide range of organic peroxides is known and commercially available. The initiators, including the organic peroxides, are activated over a wide range of temperatures. The activation temperature may be described in a parameter known as half-life. Typically values for half-lives of, for example, 0.1 hours, 1 hour, and 10 hours are given in degrees centigrade. For example a $T_{1/2}$ at 0.1 hours of 143° C. indicates that at that temperature, half of the initiator will decompose within 0.1 hours. Organic peroxides with a $T_{1/2}$ at 0.1 hours from 118° C. to 228° C. are commercially available. Such peroxides have a half-life of at least 0.1 hours at the indicated temperatures. The $T_{1/2}$ values indicate the kinetics of the initial reaction in crosslinking the fluorocarbon elastomers, that is decomposition of the peroxide to form a radical containing intermediate.

In some embodiments, it is preferred to match the $T_{1/2}$ of the initiator such as an organic peroxide to the temperature of the molten material into which the curing composition is to be added. In various embodiments, the initiator has a thermal stability such that the half-life is at least 0.1 hours at temperatures of 180° C. or higher. In other embodiments, suitable initiators have a half-life of 0.1 hours at 190° C. or higher, or at temperatures of 200° C. or higher. Non-limiting examples of peroxides and their $T_{1/2}$ for a half-life of 0.1 hours include Trigonox 145-E85 ($T_{1/2}$=182° C.), Trigonox M55 ($T_{1/2}$=183° C.), Trigonox K-90 ($T_{1/2}$=195° C.), Trigonox A-W70 ($T_{1/2}$=207° C.), and Trigonox TAHP-W85 ($T_{1/2}$=228° C.). A non-limiting example of a non-peroxide initiator is Perkadox-30 ($T_{1/2}$=284° C.). The Trigonox and Perkadox materials are commercial or developmental products of AkzoNobel.

Non-limiting examples of commercially available organic peroxides for initiating the cure of fluorocarbon elastomers include butyl 4,4-di-(tert-butylperoxy)valerate; tert-butyl peroxybenzoate; di-tert-amyl peroxide; dicumyl peroxide; di-(tert-butylperoxyisopropyl)benzene; 2,5-dimethyl-2,5-di(tert-butylperoxy)hexane; tert-butyl cumyl peroxide; 2,5,-dimethyl-2,5-di(tert-butylperoxy)hexyne-3; di-tert-butyl peroxide; 3,6,9-triethyl-3,6,9-trimethyl-1,4,7-triperoxonane; 1,1,3,3-tetramethylbutyl hydroperoxide; diisopropylbenzene monohydroperoxide; cumyl hydroperoxide; tert-butyl hydroperoxide; tert-amyl hydroperoxide; tert-butyl peroxyisobutyrate; tert-amyl peroxyacetate; tert-butylperoxy stearyl carbonate; di(1-hydroxycyclohexyl) peroxide; ethyl 3,3-di(tert-butylperoxy)butyrate; and tert-butyl 3-isopropenylcumyl peroxide.

Non-limiting examples of crosslinking co-agents include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri (5-norbornene-2-methylene) cyanurate. The crosslinking co-agents preferably contain at least two sites of olefinic unsaturation. The sites of unsaturation react with the free radical generated on the fluorocarbon elastomer molecule and crosslink the elastomer. A commonly used crosslinking agent is triallylisocyanurate (TAIC).

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the polyolefin and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such as zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carboxy block may make up to about 40% by weight of the total weight of the compositions of the invention. Preferably, the compositions comprise 1-40 weight % of filler. In other embodiments, the filler makes up 10 to 25 weight % of the compositions.

The vulcanized elastomeric material, also referred to herein generically as a "rubber", is generally present as small particles within a continuous thermoplastic polymer matrix. A co-continuous morphology is also possible depending on the amount of elastomeric material relative to thermoplastic material, the cure system, and the mechanism and degree of cure of the elastomer and the amount and degree of mixing. Preferably, the elastomeric material is fully crosslinked/cured.

The full crosslinking can be achieved by adding an appropriate curative or curative system to a blend of thermoplastic material and elastomeric material, and vulcanizing the rubber to the desired degree under conventional vulcanizing conditions. In a preferred embodiment, the elastomer is crosslinked by the process of dynamic vulcanization. The term dynamic vulcanization refers to a vulcanization or curing process for a rubber contained in a thermoplastic composition, wherein the curable rubber is vulcanized under conditions of high shear at a temperature above the melting point of the thermoplastic component. The rubber is thus simultaneously crosslinked and dispersed as particles within the thermoplastic matrix. Dynamic vulcanization is effected by mixing the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (which is preferably about 120° C. or higher, more preferably 150° C. or higher) to about 300° C. or more. Without limitation, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm, more preferably of an average size smaller than about 10 μm or less, and still more preferably of an average particle size of 5 μm or less.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process.

In a batch process, predetermined charges of elastomeric material, thermoplastic material and curative agents are added to a mixing apparatus. In a typical batch procedure, the elastomeric material and thermoplastic material are first mixed, blended, masticated or otherwise physically combined until a desired particle size of elastomeric material is provided in a continuous phase of thermoplastic material. When the structure of the elastomeric material is as desired, a curing system containing the radical initiator and crosslinking co-agent is then added while continuing to apply mechanical energy to mix the elastomeric material and thermoplastic material. Curing is effected by heating or continuing to heat the mixing combination of thermoplastic and elastomeric material in the presence of the curative agent. Following cure, the processable rubber composition is removed from the reaction vessel (mixing chamber) for further processing.

It is preferred to mix the elastomeric material and thermoplastic material at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric and polymeric material at a temperature below the curing temperature. When the desired dispersion is achieved, the temperature may be increased to effect cure. However, if the curative agent is activated at the temperature of initial mixing, it is preferred to leave out the curative until the desired particle size distribution of the elastomeric material in the thermoplastic matrix is achieved. In another embodiment, curative is added after the elastomeric and thermoplastic materials are mixed. Thereafter, in a preferred embodiment, the curative agent is added to a mixture of elastomeric particles in thermoplastic material while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, thermoplastic material and elastomeric material are combined by inserting them into the screw extruder together in a first hopper using a feeder (loss-in-weight or volumetric feeder). Temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric material and thermoplastic material to go through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative agent may be added continuously to the mixture of thermoplastic material and elastomeric material as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, even more preferably at least about 45 parts by weight rubber, and still more preferably at least about 50 parts by weight rubber per 100 parts by weight of the rubber and thermoplastic polymer combined. More specifically, the amount of cured rubber within the thermoplastic vulcanizate is generally from about 5 to about 95% by weight, preferably from about 35 to about 85% by weight, and more preferably from about 50 to about 80% by weight of the total weight of the rubber and the thermoplastic polymer combined.

The amount of thermoplastic polymer within the processable rubber compositions of the invention is generally from about 5 to about 95% by weight, preferably from about 15 to about 65% by weight and more preferably from about 20 to about 50% by weight of the total weight of the rubber and the thermoplastic combined.

As noted above, the processable rubber compositions and shaped articles of the invention include a cured rubber and a thermoplastic polymer. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of this invention are not limited to those containing discrete phases inasmuch as the compositions of this invention may also include other morphologies such as co-continuous morphologies. In especially preferred embodiments, the rubber particles have an average particle size smaller than about 50 µm, more preferably smaller than about 25 µm, even more preferably smaller than about 10 µm or less, and still more preferably smaller than about 5 µm.

The term vulcanized or cured rubber refers to a natural or synthetic rubber that has undergone at least a partial cure. The degree of cure can be measured by determining the amount of rubber that is extractable from the thermoplastic vulcanizate by using boiling xylene or cyclohexane as an extractant. This method is disclosed in U.S. Pat. No. 4,311,628. By using this method as a basis, the cured rubber of this invention will have a degree of cure where not more than 15% of the rubber is extractable, preferably not more than 10% of the rubber is extractable, and more preferably not more than 5% of the rubber is extractable. In an especially preferred embodiment, the elastomer is technologically fully vulcanized. The term fully vulcanized refers to a state of cure such that the crosslinked density is at least $7 \times 10^{-5}$ moles per ml of elastomer or that the elastomer is less than about 3% extractable by cyclohexane at 23° C.

The degree of cure can be determined by the cross-link density of the rubber. This, however, must be determined indirectly because the presence of the thermoplastic polymer interferes with the determination. Accordingly, the same rubber as present in the blend is treated under conditions with respect to time, temperature, and amount of curative that result in a fully cured product as demonstrated by its crosslink density. This cross-link density is then assigned to the blend similarly treated. In general, a cross-link density of about $7 \times 10^{-5}$ or more moles per milliliter of rubber is representative of the values reported for fully cured elastomeric copolymers. Accordingly, it is preferred that the compositions of this invention are vulcanized to an extent that corresponds to vulcanizing the same rubber as in the blend statically cured under pressure in a mold with such amounts of the same curative as in the blend and under such conditions of time and temperature to give a cross-link density greater than about $7 \times 10^{-5}$ moles per milliliter of rubber and preferably greater than about $1 \times 10^{-4}$ moles per milliliter of rubber.

Advantageously, the shaped articles of the invention, are rubber-like materials that, unlike conventional rubbers, can be processed and recycled like thermoplastic materials. These materials are rubber-like to the extent that they will retract to less than 1.5 times their original length within one minute after being stretched at room temperature to twice their original length and held for one minute before release, as defined in ASTM D1566. Also, these materials satisfy the tensile set requirements set forth in ASTM D412, and they also satisfy the elastic requirements for compression set per ASTM D395.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and reprocessing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the material and thus the overall costs of the manufacturing process.

For thermoset rubbers, such off spec materials usually can not be recycled into making more shaped articles, because the material can not be readily re-processed by the same techniques as were used to form the shaped articles in the first place. Recycling efforts in the case of thermoset rubbers are usually limited to grinding up the scrap and the using the grinds as raw material in a number products other than those produced by thermoplastic processing technique.

EXAMPLES

Viton® ETP 600S is a peroxide curable base resistant elastomer from DuPont Dow Elastomers. It is based on a copolymer of tetrafluoroethylene, ethylene, perfluoromethyl vinyl ether, and a cure site monomer.

Tecnoflon® P 757 is a peroxide curable fluorocarbon elastomer with cure site monomers, from Solvay. It is based on a terpolymer of tetrafluoroethylene, hexafluoropropylene, and vinylidene fluoride.

Hylar® MP 10 is a polyvinylidene fluoride thermoplastic polymer from Solvay.

Kynar Flex 2500-20 is a polyvinylidene fluoride based thermoplastic polymer from Atofina. It is based on a vinylidene fluoride copolymer.

Luperox® 101XL45 is a peroxide initiator from Arkema.

The comparative example is a molded base resistant fluorocarbon rubber prepared by blending the following according the manufacturer's instructions.

| Viton ETP 600S: | 100 pph |
| Luperox 101XL45: | 3 pph |
| TAIC: | 3 pph |
| ZnO: | 3 pph |
| Carbon black: | 30 pph |

The rubber is cured in a mold for 7 minutes at 177° C., and post-cured 16 hours at 232° C.

Examples 1 and 2-4 are made by dynamic vulcanization of a fluorocarbon elastomer (ETP 600S and P 757, respectively) with a radical curing system (Luperox 101XL45, triallylisocyanurate, and ZnO) in the presence of a thermoplastic (Hylar MP 10 and Kynar Flex 2500-20, respectively).

In a batch process, the peroxide curable elastomer (Tecnoflon P757 or Viton ETP 600S)) and the thermoplastic (Hylar MP-10 or Kynar Flex 2500-04) are mixed and melted in a Brabender or Banbury type batch mixer at 160° C. for 5 minutes. The zinc oxide and carbon black are then stirred in. A curative package consisting of Luperco 101 XL and TAIC is added to the mixer and stirred for an additional 3-5 minutes at 160° C. to form a fully cured thermoplastic vulcanizate. The composition is then discharged from the batch mixer and granulated to make small size pellets for use in subsequent shaped article fabrication processes, such as injection molding, compression molding, blow molding, single layer extrusion, multi-layer extrusion, insert molding, and the like.

A continuous process is carried out in a twin-screw extruder. Pellets of fluoroelastomer (Tecnoflon P757 or Viton ESP 600S) and thermoplastic (Hylar MP-10 or Kynar Flex 2500-04) are mixed and added to a hopper. The pellets are fed into the barrel, which is heated to 160° C. The screw speed is 100-200 rpm. A curative package consisting of Luperco 101 XL, TAIC, ZnO and carbon black is then fed into the barrel at a downstream port located about one third of the total barrel length from the extruder exit. The ingredients are melted and blended with the molten elastomer and fluoroplastic mixture for a time determined by the screw speed and the length of the barrel. For example, the residence time is about 4-5 minutes at 100 rpm and about 2-2.5 minutes at 200 rpm. The cured material is extruded through 1-3 mm diameter strand die and is quenched by cooling in a water bath before passing through a strand pelletizer. The pellets are to be processed by a wide variety of thermoplastic techniques into molded articles. The material is also being formed into plaques for the measurement of physical properties.

Test pieces of the comparative Example and Examples 1-4 are tested for base resistance by submerging them in a test fluid for 168 hours at 150° C. The test fluid is a mixture of 94% Stuarco 7061 gear oil with 6% Stuarco 7098 modifier.

Changes in physical properties are measured after the test and expressed as a percentage change from the value measured before the exposure. Values are reported in the Table.

|  | Comparative Example, phr | Example 1, phr | Example 2, phr | Example 3, phr | Example 4, phr |
|---|---|---|---|---|---|
| Viton ETP 600S | 100 | 100 | | | |
| Tecnoflon P757 | | | 100 | 100 | 100 |
| ZnO | 3 | 3 | 5 | 5 | 5 |
| triallylisocyanurate | 3 | 3 | 3 | 3 | 3 |
| Luperox 101XL45 | 3 | 3 | 3 | 3 | 3 |
| Carbon black | 30 | 10 | 10 | 10 | 10 |
| HylarMP-10 | | 25 | | | |
| Kynar Flex 2500-20 | | | 50 | 100 | 150 |
| Filler | | 20 | | | |
|  | % | % | % | % | % |
| Change in tensile strength | −27 | −13 | −26 | 10 | 10 |
| Change in 50% modulus | −30 | −11 | 2 | −10 | −6 |
| Change in 100% modulus | −37 | 4 | 6 | — | — |
| Change in elongation | 19 | −12 | −32 | −20 | −12 |
| Change in hardness (Shore A) | −3 | −9 | −48 | −2 | −1 |
| Change in volume | 3 | 11 | 18 | 3 | 2 |

While the invention has been disclosed herein with regard to various enabling description, it is to be understood the invention is not limited to the disclosed embodiments. Modifications and variations that will occur to one of skill in the art upon reading the description are also within the scope of the invention.

I claim:

1. A processable rubber composition comprising a vulcanized elastomeric material dispersed in a matrix,
   wherein the vulcanized elastomeric material comprises a peroxide cured fluorocarbon elastomer comprising repeating units derived from at least one fluorine containing olefinic monomer and at least one cure site monomer, the cure site monomer comprising at least one of a C—Cl bond, a C—Br bond, a C—I bond, and an olefin; and
   wherein the matrix is a fluorine containing thermoplastic polymeric material.

2. A composition according to claim 1, wherein the matrix forms a continuous phase.

3. A composition according to claim 1, wherein the vulcanized elastomeric material is in the form of particles forming a non-continuous phase.

4. A composition according to claim 1, wherein the vulcanized elastomeric material comprises repeating units derived from
   from about 10 to about 90 mole % tetrafluoroethylene;
   from about 10 to about 90 mole % $C_{2-4}$ olefin; and
   up to about 30 mole % of one or more additional fluorine containing monomers.

5. A composition according to claim 4, wherein the repeating units are derived from
   from about 25 to about 90 mole % tetrafluoroethylene and
   from about 10 to about 75 mole % propylene or ethylene.

6. A composition according to claim 4, wherein the vulcanized elastomeric material comprises repeating units derived from vinylidene difluoride.

7. A composition according to claim 1, wherein the composition comprises at least about 25 parts by weight vulcanized elastomeric material per 100 parts of the vulcanized elastomeric material and thermoplastic material combined.

8. A composition according to claim 7, wherein the composition comprises at least about 50 parts by weight vulcanized elastomeric material per 100 parts of the vulcanized elastomeric material and thermoplastic material combined.

9. A method for making a rubber composition comprising,
   forming a mixture by combining a radical curing system, an elastomeric material, and a thermoplastic material; and
   heating the mixture at a temperature and for a time sufficient to effect vulcanization of the elastomeric material, wherein mechanical energy is applied to mix the mixture during the heating step;
   wherein the elastomeric material is a polymeric material comprising repeating units derived from at least one fluorine containing olefinic monomer and from at least one cure site monomer wherein the repeating unit derived from the at least one cure site monomer comprises at least one functional group selected from the group consisting of a C—Cl bond, a C—Br bond, a C—I bond, and an olefin; and
   wherein the thermoplastic material is a fluorine containing polymeric material that softens and flows upon heating.

10. A method according to claim 9, wherein the elastomeric material comprises repeating units derived from
    from about 10 to about 90 mole % tetrafluoroethylene;
    from about 10 to about 90 mole % $C_{2-4}$ olefin; and
    up to about 30 mole % of an additional fluorine containing monomer.

11. A method according to claim 10, wherein the additional monomer comprises vinylidene difluoride.

12. A method according to claim 9, wherein the radical curing system comprises an organic peroxide and a crosslinking co-agent, the co-agent comprising at least two sites of olefinic unsaturation.

13. A method according to claim 9, comprising a continuous process.

14. A method according to claim 13, carried out in a twin screw extruder.

15. A method according to claim 9, comprising a batch process.

16. A method according to claim 9, wherein the combination comprises at least about 25 parts by weight vulcanized elastomeric material per 100 parts of the vulcanized elastomeric material and thermoplastic material combined.

17. A method according to claim 16, wherein the combination comprises at least about 50 parts by weight vulcanized elastomeric material per 100 parts of the vulcanized elastomeric material and thermoplastic material combined.

18. A shaped article comprising peroxide cured fluorocarbon elastomer particles dispersed in a fluoroplastic matrix, wherein the particles comprise a peroxide cured copolymer of at least one fluorine containing olefinic monomer and at least one cure site monomer, wherein the at least one cure site monomer comprises at least one functional group selected from the group consisting of a C—Cl bond, a C—Br bond, a C—I bond, and an olefin, wherein the shaped article exhibits superior base resistance relative to a shaped article made from the cured fluorocarbon elastomer alone, as evidenced by reduced change in modulus or tensile strength upon submersion of the shaped article in a test fluid for 168 hours at 150° C.

19. An article according to claim 18, wherein the vulcanized copolymer comprises repeating units derived from
   from about 45 to about 65 mole % tetrafluoroethylene,
   from about 20 to about 55 mole % propylene or ethylene, and
   up to about 30% of additional fluorine containing monomer or monomers.

20. An article according to claim 19, wherein the additional monomer comprises vinylidene difluoride.

21. An article according to claim 18, wherein the fluoroplastic comprises polyvinylidene fluoride.

22. An article according to claim 18, wherein the article comprises at least about 25 parts by weight vulcanized elastomeric material (per 100 parts of the vulcanized elastomeric material and thermoplastic material combined).

23. A seal according to claim 18.

24. An O-ring according to claim 18.

25. A gasket according to claim 18.

26. A hose according to claim 18.

* * * * *